H. W. DE RUITER.
AUTOMOBILE TOP.
APPLICATION FILED JULY 27, 1916.

1,301,402.

Patented Apr. 22, 1919.

INVENTOR
Harry W. De Ruiter,
by
Owen, Owen & Crampton

UNITED STATES PATENT OFFICE.

HARRY W. DE RUITER, OF TOLEDO, OHIO.

AUTOMOBILE-TOP.

1,301,402.       Specification of Letters Patent.    Patented Apr. 22, 1919.

Application filed July 27, 1916.   Serial No. 111,590.

*To all whom it may concern:*

Be it known that I, HARRY W. DE RUITER, a citizen of the United States, and a resident of Toledo, in the county of Lucas and State of Ohio, have invented a certain new and useful Automobile-Top; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to automobile tops, and it particularly has for its object to provide a top which may be easily manipulated in the folding and unfolding thereof. It also has for its object to provide a top wherein but one rear supporting brace, truss or bow member is used and wherein such supporting brace or bow member is located near the rear end of the automobile, and also wherein the supporting bow or truss member is not only located at the rear of the automobile but extends rearwardly to avoid obscuring the vision of persons located in the rear seat of the automobile. It is also an object of the invention to provide a pair of intersecting pivoted members adapted to be held in extended position on a supporting member by a flexible tension member in such a manner that the top acts on the cantaliver principle. It is a further object of the invention to provide a front and rear support for the pair of pivoted intersecting members and to arrange the intersecting members and the flexible tension member in such a manner that the top acts on the cantaliver principle. It also has for its object to provide a stiff frame which will not alter in its shape and permit its parts to become loosely interconnected. It also has for its object to provide a top which may be made at a low cost and yet which is efficient in properly supporting the covering and yet may be easily folded and unfolded.

The invention may be contained in many forms of construction usable for awnings and coverings of different kinds and for different purposes, all of which come within the purview of my claims hereinafter appended. To show the practicability of my invention I have selected one of such constructions as an example and shall describe it hereinafter. The construction selected is illustrated in the accompanying drawings.

Figure 1:
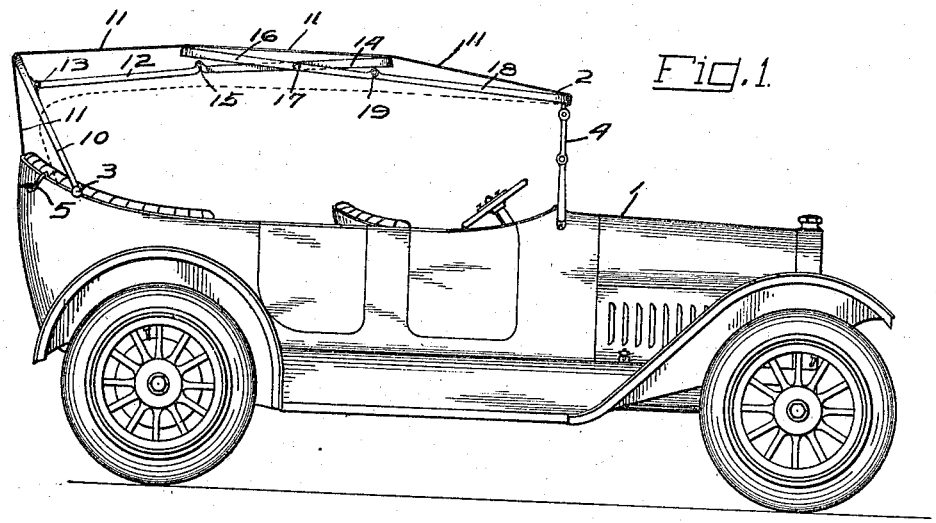
Figure 4:
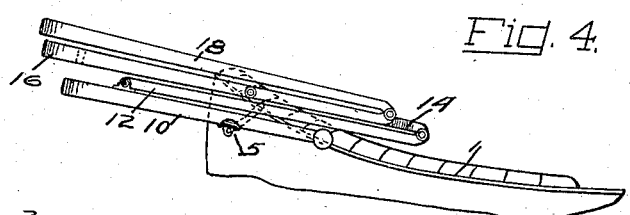
Figure 2:
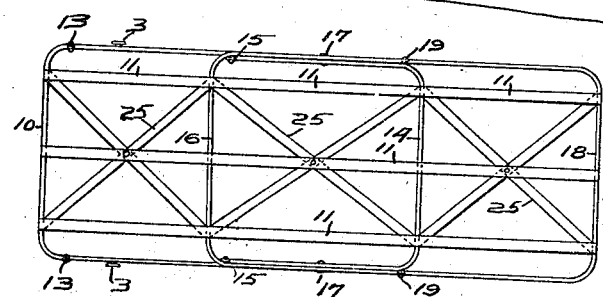
Figure 3:
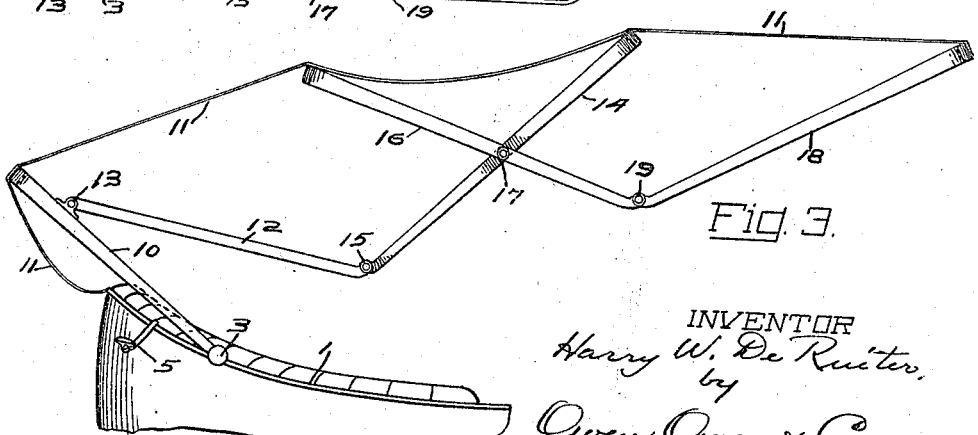

Figure 1 of the drawings is a side view of an automobile having thereon a top which involves the use of my invention. Fig. 2 illustrates a top view of the frame showing more particularly the interconnecting strap or tension members. Fig. 3 illustrates the position of the frame while being folded. Fig. 4 illustrates the top frame folded.

1, Fig. 1, is an automobile on which is mounted the top 2. The top 2 is pivoted at 3 to the automobile 1 in the manner well known in the art. Its forward end rests upon the windshield 4 and may be secured thereto by suitable clamps of the character also well known in the art. When folded the top rests on the bracket 5, which is also of the form well known in the art. The top is provided with a supporting bow 10, which is pivotally connected to the body of the vehicle by the pivot-pins 3. The bow 10 is preferably inclined rearwardly. It may be rotated about the pivot-pins 3 downwardly and rearwardly and so as to rest upon the bracket 5. In its forward rotation it is limited by straps 11, which are secured to the rear end of the automobile and to the transverse portion of the bow. Compression members or links 12 are pivoted near the top of the bow 10 by the pins 13. A bow 14 is connected to the links 12 by means of pins 15. The ends of the links and the ends of the bows are curved upward so as to bring the pins 15 above the line connecting the transverse portion of the bow 14 with the pin 13. The strap 11 is continued from the transverse portion of the bow 10 to the transverse portion of the bow 14. The links 12 and the bows 14 are provided with limiting stops or knife-blade joints to limit the movement of the bow 14 relative to the links 12. A bow 16 is pivotally connected to the bow 14. The legs of the bows 14 and 16 are pivotally connected by the pivot-pins 17, which are located centrally in the legs of the bows. The transverse portion of the bow 16 is located intermediate the transverse portions of the bows 10 and 14 and is secured to the straps 11. A bow 18 is also knuckled to the straps 11. A bow 18 is also knuckled to the bow 16 by the pivot-pins 19, which pass through the ends of the bows 16 and 18. The straps 11 are continued and secured to the transverse portion of the bow 18. The transverse portions of the bows of the top are thus secured to the straps 11, which at their rear ends are secured to the rear end of the automobile. To ease the pull on the rear ends of the straps 11 and to prevent lateral swinging of the top when the automobile is in motion the forward edge of the top of the automobile may rest upon the windshield 4 and be secured thereto by suitable clamps of the form well known in the art.

From the above description it can be seen that the top will automatically maintain its extended position without the aid of the wind shield. In such case the weight of the top holds the supporting member 10 in its upright or supporting position and the tension member alone supports the links 12 and the bows 14, 16 and 18 in extended position on the supporting member. The top therefore acts on the cantaliver principle, the intersecting bows together with the links 12 and bow 18 serving as the compression members while the tension member 11 serves as the stress means for the cantaliver frame. It is also evident that the top acts on the cantaliver principle when the forward end of the bow 18 is connected to the wind shield. In both cases the action of the intersecting bows and of the tension lever serves to maintain the top in a taut condition. When a top is in extended position the bow 14 and links 12 may be considered as a unitary member, while the bows 16 and 18 may also be considered as a unitary member and some of the claims bring this out by merely reciting two intersecting bows.

If desired the knuckles, which are formed at the ends of the bows 14, 16 and 18, may be extended so as to rest against the bows 14 and 16. Diagonally located straps 25 may also interconnect the bows to stiffen the top and prevent lateral swinging of the bows relative to each other.

In the folding operation the person folding the top will stand between the front and rear seats and after disconnecting the forward end of the top from the windshield 4, will raise the transverse portions of the bows 14 and 16 and at the same time move the bows rearwardly. The bow 10 will swing rearwardly on account of the weight of the top and the bow 10 and the pressure of the links 12. The portions of the straps 11 located intermediate the transverse portions of the bows 10 and 16 will remain slightly taut, or will sag but little, and the portions of the straps 11 located intermediate the transverse portions of the bows 14 and 18 will remain slightly taut by reason of the weight of the bow 18 and that portion of the cover or top. The bows 14 and 16 are carried rearwardly until the bow 10 rests on the bracket 5, whereupon the bows 14 and 16 are folded about the pivot-pins 17, which carry the bow 18 rearwardly until the knuckles connecting it with the bow 16 are located beside the rear seat, whereupon the bow 18 drops in position beside the bow 14.

In unfolding the top the bow 18 is tipped forward until the strap 11 begins to draw on the bow 14, which lifts the bow 16, whereupon the bows 14 and 16 are then lifted and carried forward and moved through the position shown in Fig. 3 of the drawings. The transverse portions of the bows 14 and 16 are separated and when substantially in position the pivot-pins 15 and 19 are snapped upward so as to place them above the lines of compression extending through the bows and the links.

The construction selected may be greatly modified in the arrangement and manufacture of its parts and in the substitution of elements having equivalent functions, and such modifications may be used for varied purposes and still contain the invention.

What I claim is:

1. In a canopy covering, the combination of a supporting bow, a pair of bows pivoted together, links connecting the ends of one of the last named bows to the supporting bow and lying substantially in the same plane therewith, a fourth bow pivoted to the ends of the other of the second named bows and lying substantially in the same plane, and a tension member connecting the supporting bow to the bow connected to the fourth bow and the link connected bow to the last named bow and the link connected bow to the fourth bow.

2. In a canopy covering, the combination of a supporting member, a first forwardly extending bow jointed intermediate its ends and pivoted at its rear end to said support, a second forwardly extending bow jointed intermediate its ends and pivoted to the first bow at points intermediate the joints and forward end of the first bow, and a tension member connected to said support and bows, the second bow being adapted to be solely supported at said pivotal points and by the tension member.

3. In a folding canopy covering the combination of a supporting member, a pair of intersecting bows, pivots pivoting one end of one of the bows to said support, pivots pivoting the two bows together and a tension member which together with both the first and second named pivots constitute the sole means for holding the bows in extended position on the supporting member.

4. In a folding canopy covering the combination of a supporting member, a pair of intersecting bows, pivots pivoting one end of one of the bows to said support, pivots pivoting the two bows together on their line of intersection, a tension member which, together with both the first and second named pivots, is adapted to serve as the only means for holding the bows in extended position on the supporting member, and limiting stop joints intermediate the ends of each bow, the pivotal centers of the joints of the bows being above the lines of compression extending through the respective bows.

5. In a canopy covering the combination of a pivoted supporting member, a first forwardly extending bow pivoted at its rear end to said supporting member, a second forwardly extending bow intersecting the first bow and pivoted thereto, and a tension member adapted to maintain the bows in their extended intersecting position with the line of intersection of the bows above the plane passing longitudinally through the rear end of the first bow and the forward end of the second bow, the supporting member being adapted to be held in supporting position by said tension member and the weight of the covering.

6. In a canopy covering, the combination of a supporting member, a first forwardly extending bow pivoted at its rear end to said supporting member, a second forwardly extending bow which intermediate its ends intersects the first bow on a line intermediate the ends of the first bow, means for pivoting said bows together, joints in said first bow intermediate its rear end and said line of intersection; joints in the second bow intermediate said line of intersection and its forward end, and a tension member connected to said support and the forward end of the second bow and passing over the adjacent ends of the bows the combined length of the bows from their line of intersection to the front end of the second bow and the rear end of the first bow being less than the length of the tension member between its points of connection with the supporting member and the front end of the second bow so that the tension member constitutes the sole means for supporting the bows in extended position on the supporting member.

7. In a canopy covering, the combination with a supporting member, a first bow comprising a cross member and arms, limiting stop joints in said arms, the arms and joints being constructed so that the arms lie substantially in one plane, and the pivots of the joints lie above said plane, a second bow comprising a cross member and arms intersecting the arms of the first bow and pivoted thereto on the line of intersection, limiting stop joints in the arms of the second bow, the arms and joints being constructed so that the arms lie substantially in one plane, and the pivots of the joints lie above said plane, and a tension member adapted to support the bows on the supporting member on the cantaliver principle.

8. In a canopy covering the combination of a rear support, a forwardly extending bow adapted to be connected to said support at its rear end, a front support, a second forwardly extending bow connected at its front end to said front support and intersecting intermediate its ends said first forwardly extending bow at points intermediate the ends of the latter, pivots pivoting the two bows together on their line of intersection, the line of intersection being above the plane passing through the points of connection of the bows with their supports, and limiting stop joints intermediate the ends of each bow and having their pivotal centers above the lines of compression extending through the respective bows.

9. In a canopy covering, the combination of a pivoted rear support, a forwardly extending bow connected at its rear end to said support, a front support, a second forwardly extending bow adapted to be detachably connected at its forward end to said front support, pivots pivoting the bows together at their points of intersection, the bows being positioned when extended to intersect intermediate their ends, and limiting stop joints intermediate the ends of each bow and having their pivotal centers above the lines of compression extending through the respective bows.

10. In a device of the class described, the combination of a supporting member, a first forwardly extending bow jointed intermediate its ends and pivoted at one of its ends to said support, a second bow, pivots pivoting the two bows together, and a tension member which together with the first and second mentioned pivots constitute the sole means for holding the bows in extended position on the supporting member.

11. In a device of the class described, the combination of a supporting member, a bow, a second bow jointed intermediate its ends, the first mentioned bow being pivoted to said support, pivots pivoting the two bows together, and a tension member which, together with both the first and the second named pivots, constitute the sole means for holding the bows together in extended position on the supporting member.

In testimony whereof, I have hereunto signed my name to this specification.

HARRY W. DE RUITER.

Copies of this patent may be obtained for five cents each, by addressing the "Commissioner of Patents, Washington, D. C."